(12) United States Patent
Boud et al.

(10) Patent No.: US 11,375,165 B2
(45) Date of Patent: Jun. 28, 2022

(54) IMAGE CALIBRATION FOR PROJECTED IMAGES

(71) Applicant: IMMERSAVIEW PTY LTD, Banyo (AU)

(72) Inventors: Andrew Charles Boud, Banyo (AU); Shaun Andre Burns, Banyo (AU); Edward Wigg, Banyo (AU); Vishesh Bhartiya, Banyo (AU); Alexander Talesin Streit, Banyo (AU)

(73) Assignee: ImmersaView Pty., Ltd., Banyo (AU)

( * ) Notice: Subject to any disclaimer, the term of this patent is extended or adjusted under 35 U.S.C. 154(b) by 0 days.

(21) Appl. No.: 17/046,729

(22) PCT Filed: Apr. 10, 2019

(86) PCT No.: PCT/AU2019/050316
§ 371 (c)(1),
(2) Date: Oct. 9, 2020

(87) PCT Pub. No.: WO2019/195884
PCT Pub. Date: Oct. 17, 2019

(65) Prior Publication Data
US 2021/0152796 A1  May 20, 2021

(30) Foreign Application Priority Data
Apr. 10, 2018  (AU) ................................ 2018901183

(51) Int. Cl.
*H04N 9/31* (2006.01)
*G06T 7/73* (2017.01)
(Continued)

(52) U.S. Cl.
CPC ........... *H04N 9/3185* (2013.01); *G03B 21/26* (2013.01); *G03B 21/606* (2013.01); *G06T 3/005* (2013.01);
(Continued)

(58) Field of Classification Search
CPC .. H04N 9/3185; H04N 9/3147; H04N 9/3194; G06T 7/74; G06T 7/337;
(Continued)

(56) References Cited

U.S. PATENT DOCUMENTS 6,618,076 B1  9/2003  Sukthankar et al.
7,763,836 B2  7/2010  Webb et al.
(Continued)

FOREIGN PATENT DOCUMENTS

WO  WO 2013/121712 A2  8/2013

OTHER PUBLICATIONS

International Search Report dated Jul. 11, 2019 for International Application No. PCT/AU2019/050316; in English.
(Continued)

*Primary Examiner* — Michael Lee
(74) *Attorney, Agent, or Firm* — Martin & Ferraro, LLP

(57) ABSTRACT

Systems, methods and apparatus to continuously calibrate images displayed on a screen or surface by one or more projection devices during display of the images are disclosed. The systems, methods and apparatus comprise defining a plurality of fiducial markers on the screen, detecting, by a registration device, such as a camera, the plurality of fiducial markers in an image of the screen, adding a plurality of reference markers to an image displayed on the screen, detecting, by the registration device, the plurality of reference markers in the displayed image, determining a mapping between positions of the reference markers on the screen to positions of the reference markers in the displayed images, calculating an image warp based on the mapping and a layout of the images to be displayed and applying the image warp to images from an image generator to produce geometrically corrected images for display on the screen.

24 Claims, 7 Drawing Sheets

(51) Int. Cl.
*G06T 7/33* (2017.01)
*G03B 21/26* (2006.01)
*G03B 21/606* (2014.01)
*G06T 3/00* (2006.01)

(52) U.S. Cl.
CPC .......... *G06T 3/0068* (2013.01); *G06T 3/0093* (2013.01); *G06T 7/337* (2017.01); *G06T 7/74* (2017.01); *H04N 9/3147* (2013.01); *H04N 9/3194* (2013.01); *G06T 2207/30204* (2013.01)

(58) Field of Classification Search
CPC ..... G06T 3/005; G06T 3/0068; G06T 3/0093; G06T 2207/30204; G06T 5/006; G03B 21/26; G03B 21/606; G03B 35/20; G03B 17/54; G03B 43/00; G06K 2009/3225; G06K 9/6203
USPC ........................................................ 348/135
See application file for complete search history.

(56) References Cited

U.S. PATENT DOCUMENTS

| | | | |
|---|---|---|---|
| 8,328,365 | B2 | 12/2012 | Sun |
| 9,756,303 | B1 | 9/2017 | De La Cruz et al. |
| 2003/0142883 | A1* | 7/2003 | Ishii .......................... G06T 7/70 382/284 |
| 2007/0291186 | A1 | 12/2007 | McDowall et al. |
| 2008/0101725 | A1* | 5/2008 | Lin ....................... H04N 9/3194 382/286 |
| 2010/0277655 | A1* | 11/2010 | Sun .......................... H04N 9/12 348/744 |
| 2011/0025929 | A1* | 2/2011 | Wu ....................... H04N 9/3194 348/745 |
| 2011/0176007 | A1* | 7/2011 | Ding ..................... H04N 9/3194 348/189 |
| 2011/0216205 | A1 | 9/2011 | Flatt et al. |
| 2011/0242332 | A1 | 10/2011 | McFadyen et al. |
| 2013/0141593 | A1* | 6/2013 | Bassi .................... H04N 9/3194 348/188 |
| 2014/0152904 | A1* | 6/2014 | McDowall ............. G03B 21/10 348/745 |
| 2016/0037144 | A1* | 2/2016 | Schultz ................ H04N 9/3194 348/745 |
| 2016/0363842 | A1* | 12/2016 | Timoner .............. H04N 9/3185 |

OTHER PUBLICATIONS

Written Opinion of the ISA dated Jul. 11, 2019 for International Application No. PCT/AU2019/050316; in English.

International Preliminary Report on Patentability dated Oct. 13, 2020 for corresponding PCT Application No. PCT/AU2019/050316 (in English).

* cited by examiner

IMAGE CALIBRATION FOR PROJECTED IMAGES

This application is a U.S. National Phase Application under 35 U.S.C. § 371 of International Application No. PCT/AU2019/050316, filed Apr. 10, 2019 (Published on Oct. 17, 2019 as WO 2019/195884); which claims priority to Australia Application No. 2018901183, filed Apr. 10, 2018, all of which are incorporated by reference herein in their entirety.

FIELD OF THE INVENTION

The present invention relates to the calibration of images projected onto surfaces and typically surfaces that are non-planar. In particular, but not exclusively, the present invention relates to methods of calibration of images projected onto curved surfaces from multiple projectors to create seamless images and to related systems and apparatus.

BACKGROUND TO THE INVENTION

In the field of projectors and image projection, a rectangular image is typically projected from the light source onto a display surface, such as a screen or a wall. Often, display surfaces are complex non-planar surfaces or not uniform in shape. For example, the display surface can be curved for applications such as flight simulators, or the surface can be non-uniform and comprise irregular shapes for applications such as building projections.

Conventional systems for projecting images onto complex surfaces include a projector or projectors, laser levels, measurement devices, such as a tape measure and/or a laser measure, theodolites, USB cameras, digital cameras, SLR cameras and/or IP cameras and fiducial markers.

However, some problems exist with known systems and methods for projecting images onto display surfaces. For example, for known categories of image correction, such as geometric correction, image warping and image blending, multiple projectors are used to create a seamless image across flat, cylindrical, spherical and non-uniform display surfaces. This can be achieved manually, or with digital cameras. However, these techniques are typically performed once in a time period from daily to yearly and often require human intervention. A separate maintenance or alignment sequence is generally required.

For the display of images where movement within structures are common, such as vibration, or for applications such as flight simulators comprising motion platforms, movement of the projectors can occur, resulting in alignment issues while the display is being used. This results in images that become misaligned during the general operation of the display system.

The reference to any prior art in this specification is not, and should not be taken as, an acknowledgement or any form of suggestion that the prior art forms part of the common general knowledge.

OBJECT OF THE INVENTION

It is a preferred object of the present invention to provide a system and/or a method and/or an apparatus that addresses or at least ameliorates one or more of the aforementioned problems and/or provides a useful commercial alternative.

SUMMARY OF THE INVENTION

Generally, the present invention relates to systems, methods and apparatus that allow complex display systems comprising one or more projection devices to be calibrated whilst the display system is in normal operation, rather than using a calibration sequence as a separate process outside normal operation of the display system. The methods of the present invention can be performed during, or outside normal operation of the display systems as a single process, repeatedly or continually.

The systems, methods and apparatus of the present invention use registration devices, such as cameras to align and blend overlapping images from one or more projection devices to the shape of a planar or non-planar screen.

The systems, methods and apparatus determine projected points or reference markers on the screen and calculate a mapping from the displayed image to provide a geometrically corrected output image that can be used to produce a seamless display.

The projected points or reference markers can be pre-defined or can be detected ad hoc, including features detected in arbitrary images. The systems, methods and apparatus enable repeated or continuous alignment at run-time, i.e. during display of the images. The systems, methods and apparatus enable alignment image processing to be embedded in the one or more projection devices, to be placed in the path between an image generator and the one or more projections devices, or to be applied by the image generator itself.

In one form, although not necessarily the broadest form, the invention resides in a method to continuously calibrate images projected on a screen or surface or intermediary viewing surface by during display of the images, the method comprising:

defining a plurality of fiducial markers on the screen;

detecting, by a registration device, such as a camera, the plurality of fiducial markers in an image of the screen;

adding a plurality of reference markers to an image projected on the screen;

detecting, by the registration device, the plurality of reference markers in the projected image;

determining a mapping between positions of the reference markers on the screen to positions of the reference markers in the projected images;

calculating an image warp based on the mapping and a layout of the images to be displayed; and applying the image warp to images from an image generator to produce geometrically corrected images for display on the screen.

The method may include calculating a first transformation between positions of the fiducial markers on the screen and respective positions of the fiducial markers in the images detected by the registration device.

The method may include detecting a plurality of feature points in the images detected by the registration device, wherein the feature points are known positions in the images projected by the one or more projection devices.

Suitably, the method includes calculating a second transformation between the plurality of reference markers and feature points in the images displayed on the screen and respective positions of the plurality of reference markers and feature points in the images detected by the registration device.

Suitably, the method includes combining the first transformation and the second transformation to determine the mapping for positions on the screen to positions in the displayed images.

Suitably, the method includes defining a description of the screen, such as a 3D model of the screen, a geometric shape; a mesh of points; an interpolated point cloud. The description of the screen can be user-defined or computer generated using methods such as photogrammetry, reconstruction from LiDAR data or other measurements, or a depth-based method.

In some embodiments, the method includes defining a layout of the images to be displayed on the screen including any overlaps or blend zones of the images.

The method may include projecting and positioning the fiducial markers on the screen. Alternatively, the fiducial markers are physical markers on the screen.

Suitably, the feature points are calculated in known positions in the one or more images. Alternatively, the features points are extracted from a displayed arbitrary image.

The method may include applying the image warp to images from an image generator during runtime using hardware or software image warping techniques.

Suitably, adding the plurality of reference markers to the projected image comprises embedding the reference markers in an operational image with a higher and/or lower intensity, luminance or chrominance than the remainder of an operational image.

Suitably, adding the plurality of reference markers to the projected image comprises encoding a registration image into a structured pattern, such as a structured noise pattern, and combining the structured pattern with an operational image to produce the projected image.

The method may include extracting the plurality of reference markers from the projected image using a background subtraction technique to subtract the operational image from accumulated frames of the projected image.

The method may include tuning the sensitivity of the registration device based on an average luminance or chrominance of the operational image.

Preferably, the plurality of reference markers is imperceptible to a human.

The method may include chrominance shifting pixels in the projected image in a defined pattern, in particular, chrominance shifting a centre pixel in one direction and chrominance shifting the adjacent pixels in the opposite direction.

The method may include detecting one or more features in the operational image using computer vision analysis before projection of the operational image and searching for the same one or more features in the projected image detected by the registration device.

Suitably, the method includes one or more of the following: a) amplifying the reference markers embedded in the background of the operational image while reducing the reference markers embedded in the foreground of the operational image; b) determining shadow in the operational image and amplifying the reference markers in shadow.

Suitably, detecting reference markers in an overlap or blend zone of images from multiple projection devices comprises detecting the reference markers in an image from a single projection device at a time.

The method may include suppressing the same reference markers in the overlap or blend zone from the other projection devices until the reference markers are detected for the first projection device.

The method may include applying a weighted contribution of the pixels at the location of the reference markers that is being measured toward the selected projection device.

The method may include placing additional reference markers near the overlap or blend zone and extrapolating into the blend overlap or blend zone.

The method may include using a unique pattern of registration markers for each projection device.

Suitably, the method comprises projecting alternating image states on the screen or surface, such as alternating white and black images.

The method may comprise measuring latency between projection of the images and when the change in the image states is registered by the registration device.

The method may comprise measuring the sensitivity of the registration device, such as a white/black balance of the registration device.

The method may comprise receiving each frame of the operational image in a frame buffer of the image generator during display of the images.

Suitably, the method comprises one or more of the following: a) applying an image warping pattern to the frame buffer; b) calculating and adding the reference markers to the frame buffer; c) displaying the frame buffer through the projection device.

The method may comprise determining if the reference markers are outside a predetermined or specified tolerance, and if so, smoothly interpolating the image warping pattern over a period of time to a new image warping pattern.

In another form, although not necessarily the broadest form, the invention resides in a system to continuously calibrate images displayed on a screen or surface or intermediary viewing surface by one or more projection devices, the system comprising:
one or more image generators;
one or more projection devices to project images generated by the one or more image generators onto a screen;
one or more registration devices, such as cameras, to capture images of the screen; and
one or more processors configured to:
define a plurality of fiducial markers on the screen;
detect, by the registration device, the plurality of fiducial markers in an image of the screen;
add a plurality of reference markers to an image projected on the screen;
detect the plurality of reference markers in the projected image;
determine a mapping between positions of the reference markers on the screen to positions of the reference markers in the projected images;
calculate an image warp based on the mapping and a layout of the images to be displayed; and
apply the image warp to images from one or more image generators to generate geometrically corrected images for display on the screen.

In a further form, although not necessarily the broadest form, the invention resides in an apparatus to continuously calibrate images displayed on a screen or surface or intermediary viewing surface by one or more projection devices during display of the images, the apparatus comprising a non-transitory computer-readable medium have stored thereon programming instructions executable by a processor which, when executed, perform the following operations:
defining a plurality of fiducial markers on the screen;
detecting, by a registration device, such as a camera, the plurality of fiducial markers in an image of the screen;
adding a plurality of reference markers to an image projected on the screen;
detecting, by the registration device, the plurality of reference markers in the projected image;
determining a mapping between positions of the reference markers on the screen to positions of the reference markers in the projected images;
calculating an image warp based on the mapping and a layout of the images to be displayed; and applying the image warp to images of an image generator to produce geometrically corrected images for display on the screen.

Further forms and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein.

Figure 1:
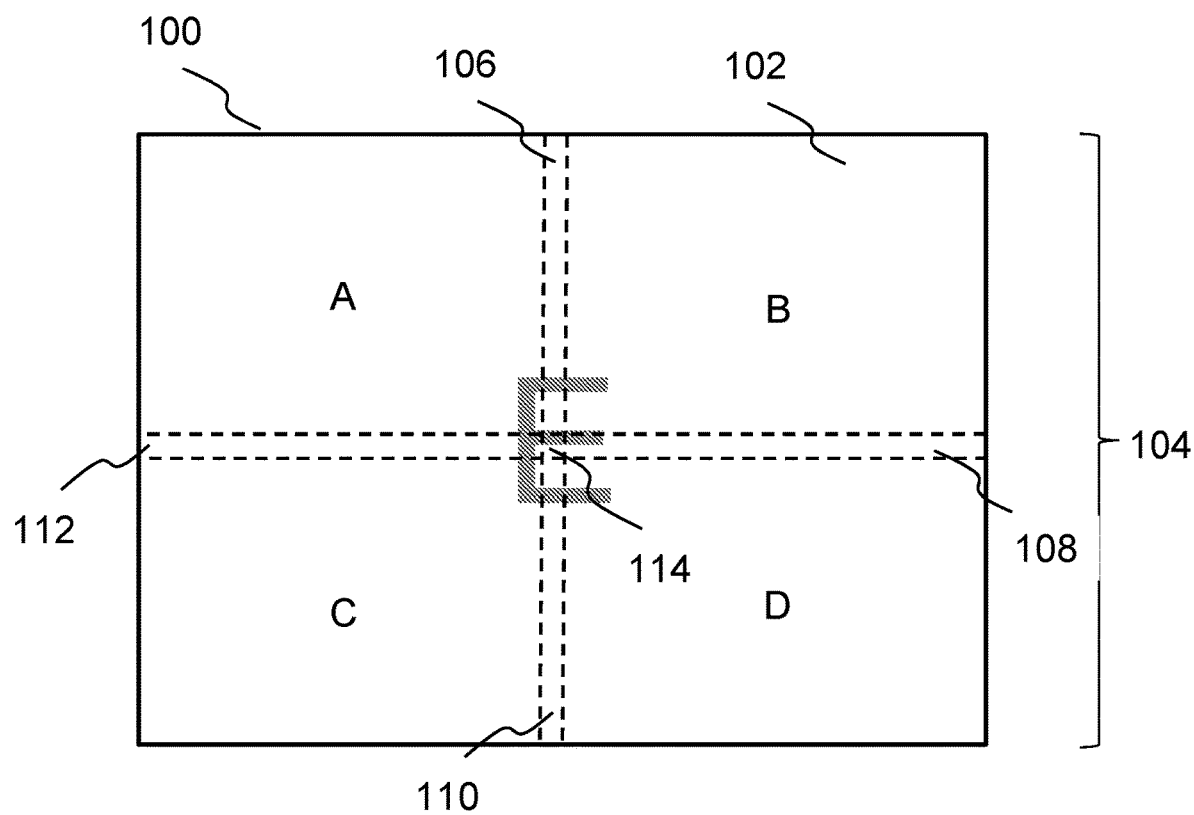
FIG. 1 is a front view illustrating a screen or surface or intermediary viewing surface displaying overlapping images from multiple projectors.

Skilled addressees will appreciate that the drawings may be schematic and that elements in the drawings are illustrated for simplicity and clarity and have not necessarily been drawn to scale. For example, the relative dimensions of some of the elements in the drawings may be distorted and/or one or more other features may have been omitted to help improve the understanding of embodiments of the present invention.

DETAILED DESCRIPTION OF THE INVENTION

The present invention relates to systems, methods and apparatus that allow complex display systems comprising one or more projectors to be repeatedly or continually calibrated whilst the display system is in normal operation to align and blend overlapping images from the projectors to the shape of a uniform or non-uniform planar or non-planar screen or surface or intermediary viewing surface. The methods of the present invention can be applied as a single process and/or can be applied outside normal operation of complex display systems. References herein to a screen include a viewing surface such as a screen, a surface of a structure, such as but not limited to a building or object, or an intermediary viewing surface, such as, but not limited to a collimated display as used in flight simulators.

FIG. 1 is a front view illustrating a screen 100 displaying overlapping images 102 projected onto the screen from multiple projectors. In this example, overlapping images 102 comprise images A, B, C and D. Each of the images overlaps to an extent with each of the other images to produce a composite image 104 represented by image E in FIG. 1. The composite image 104 includes overlaps 106, 108, 110, 112 between images A and B, between images B and D, between images C and D and between A and C respectively. In this example, there is also effectively an overlap 114 between all of the images A to D at the centre of the image.

Figure 2:
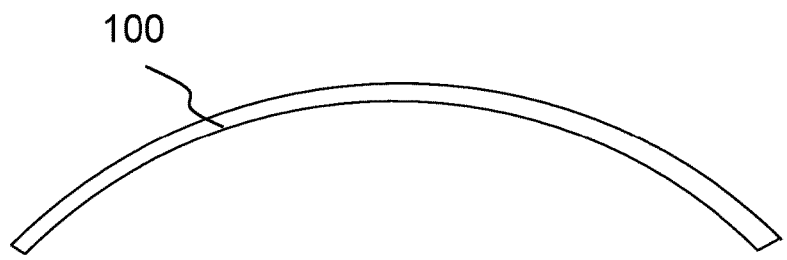
FIG. 2 is a plan view of the screen or surface shown in FIG. 1.

FIG. 2 is a plan view of the screen or surface 100 shown in FIG. 1, which shows that the screen 100 is curved in this example. However, in other examples the screen can be flat or have another shape. The screen 100 may or may not have a uniform surface.

It will be appreciated that the shape of the screen 100, the number of images 102 that make up the composite image 104 and the manner in which the images 102 overlap as shown in FIGS. 1 and 2 is just one example which is not limiting to the present invention. It will be appreciated that a wide variety of screen shapes, sizes and surface configurations are available upon which various numbers and arrangements of overlapping images can be projected and it is envisaged that the present invention can be applied to many such screen shapes, sizes, surface configurations and image arrangements. Furthermore, the characteristics of the screen or surface need not be static or constant, but can be dynamic, i.e. the characteristics of the screen or surface can change over time.

Figure 3:
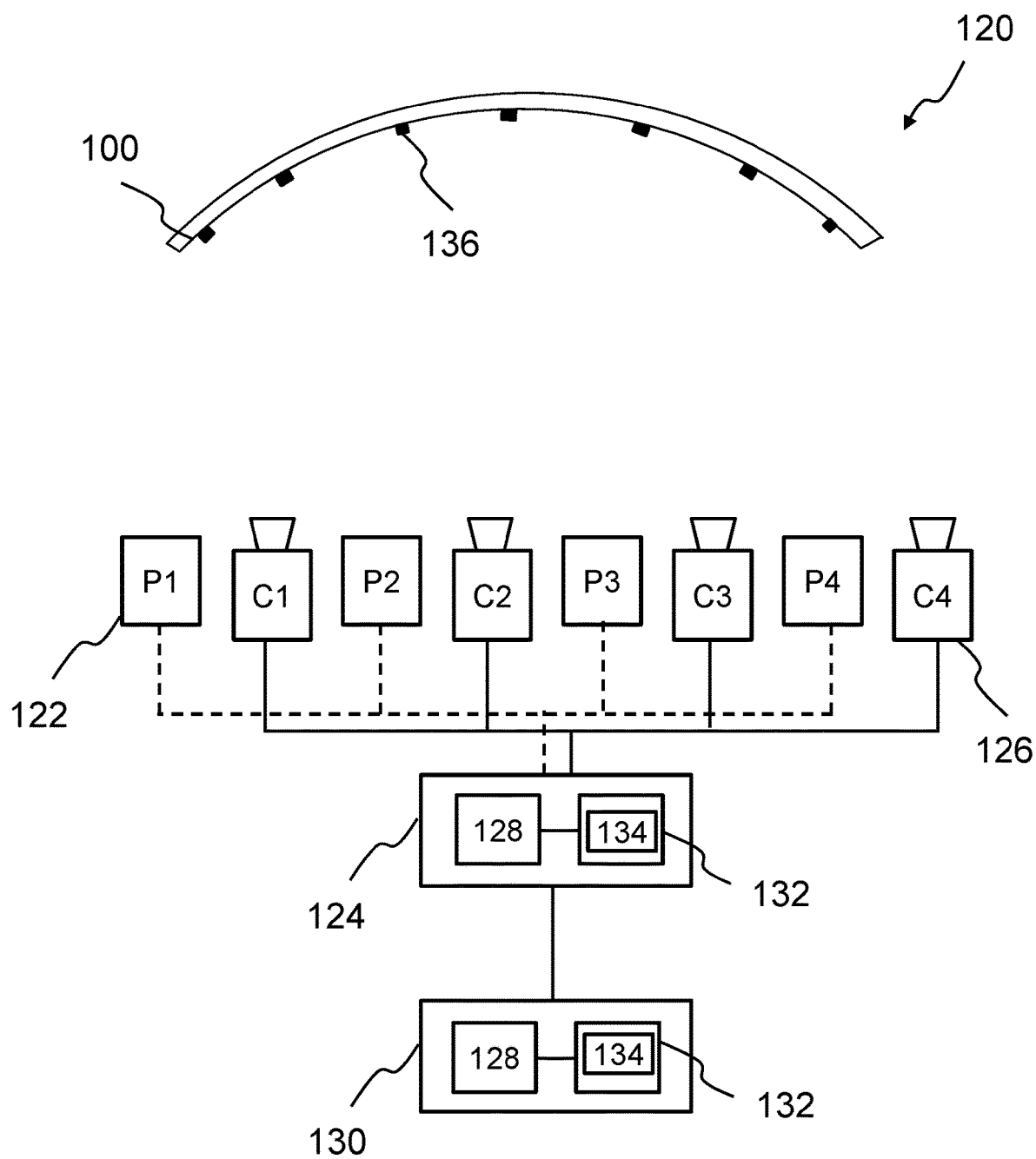
FIG. 3 is a schematic diagram illustrating a system according to an embodiment of the invention.

FIG. 3 illustrates a system 120 to calibrate images displayed on a screen or surface 100 by one or more projection device 122 according to an embodiment of the present invention. In the example shown in FIG. 3, the system comprises four projection devices 122, P1, P2, P3 and P4, but it will be appreciated that other numbers of projection devices can be used depending on the particular application. The projection devices can be, for example, lamp-based projectors, lasers, light-emitting diodes (LEDs) or other types of projection devices. The system 120 comprises one or more image generators 124, such as a computing device, which generates images for projection onto the screen 100 by the one or more projection devices 122. The system 120 comprises one or more registration devices in the form of, for example, cameras 126 to capture images of the screen 100. In the example shown in FIG. 3, the system comprises four cameras 126, C1, C2, C3 and C4, but it will be appreciated that other numbers of cameras can be used depending on the particular application. The cameras 126 can be USB cameras, digital cameras, SLR cameras, IP cameras and/or other light or image capturing devices, such as light sensors.

The system 120 also comprises one or more processors 128 configured to perform the operations of the present invention, or a subset thereof, as described herein. One or more processors 128 can be part of the one or more image generators 124 and/or can be part of a separate computing device 130 in communication with the one or more image generators 124. In some embodiments, the processor of the image generator 124 can be a master processor and the processor of another one of the image generators 124 and/or the processor of the separate computing device 130 can be a slave processor. The system 120 also comprises a computer-readable medium 132 have stored thereon programming instructions 134 executable by one of the processors 128 which, when executed, perform the operations of the present invention as described herein. The one or more image generators 124 and the separate computing device 130, if used, comprise the computer-readable medium 132.

The one or more image generators 124 produce specific images that are required to initialize the system. The one or more processors 128 and associated computer-readable media 132 receive images from the cameras 126, or other registration devices, to enable calculation of the alignment and blending of the images. Such calculations can be performed on one or more of the image generators 124 or on the separate computing device 130 in communication with the one or more image generators 124. The images can include one or more registration images, one or more operational image and one or more projection image. A registration image is a structured pattern that, when correctly measured, allows the extraction of locations of registration markers. An operational image is a structured pattern that is used for the operation of the system. In one use case this is a visual image that appears seamless and geometrically correct to a human observer. A projection image is a combination of the registration and operational images.

The system 120 also comprises or utilises a number of markers or points, including reference markers or registration markers, fiducial markers 136 and feature points. Reference markers or registration markers are markers present in the registration image, or embedded in the operational image that, when correctly measured, determine the location of the markers in real space. Reference markers or registration markers can be imperceptible to the human eye, including, but not limited to imperceptible changes in luminosity and/or chroma in the human visible spectrum or in wavelengths outside the human visible spectrum, such as infrared. Fiducial markers 136 are used to identify known physical positions on the screen 100 and are used to determine a correspondence between a location in the source projection image and a location in the real-world projected image. This provides a link from the cameras 126, or other registration devices, to the screen 100 and to the displayed image. Fiducial markers 136 can be positioned in the projected image as part of the system initialization. Alternatively, if using automatic fiducial detection, the fiducial markers 136 are physically placed on the screen 100. In some embodiments of the invention, fiducial markers and reference or registration markers are co-located, although this is not an essential requirement. Other methods of continuous measurement can also be employed. Feature points are existing points in the operational image. The use of the reference/registration markers, fiducial markers and feature points in the present invention will be described in the following description of the method.

Figure 4:
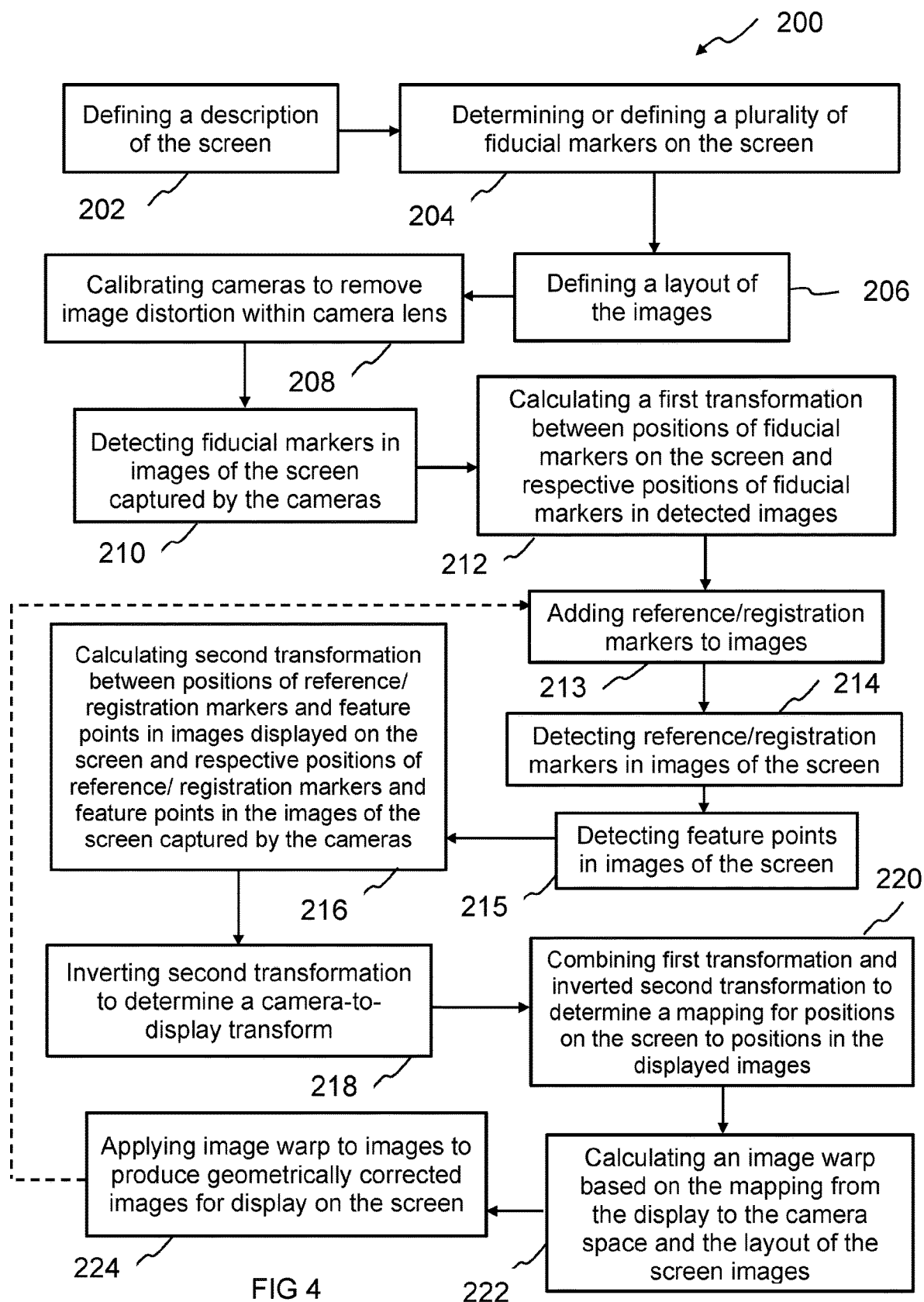
FIG. 4 is a general flow diagram of methods according to embodiments of the invention.

FIG. 4 is a general flow diagram illustrating methods 200 to calibrate images displayed on a screen or surface 100 by one or more projection devices 122 according to embodiments of the invention.

Method 200 comprises at 202 defining a description of the screen, such as a 3D model of the screen. The screen description is a mathematical definition of the screen 100 that can be used to map points to and from the 2-dimensional (2D) surface of the screen to a 3-dimensional (3D) space. The screen description does not have to have a particular form. It can be a geometric shape, a mesh of points or an interpolated point cloud. The description of the screen can be user-defined or computer generated using methods such as photogrammetry, reconstruction from light detection and ranging (LiDAR) data or other measurements.

For non-rigid screens or screens that are difficult to describe mathematically, the shape of the screen 100 can be determined using depth based methods (e.g. stereo cameras). Along with continuous alignment, such depth-based screen shape reconstruction also allows for the alignment of images on dynamically changing surfaces.

At 204, the method comprises determining or defining a plurality of fiducial markers 136 on the screen 100. This can include projecting and positioning the fiducial markers 136 on the screen 100. Alternatively, the fiducial markers 136 are physical markers on, or placed on the screen 100. The fiducial markers 136 can be used as a visible reference points for the cameras 126 or other registration devices that will be used to position and scale the screen model so that it corresponds to the camera image.

At 206, the method optionally comprises defining a layout or relationship of the images 102 to be displayed on the screen 100 including the positions of the images 102 on the screen 100 and any overlaps or blend zones of the images, such as overlaps 106, 108, 110, 112 shown in FIG. 1. The layout can be predefined or calculated when mapping from the screen to the display, i.e. during calibration.

At 208, the method comprises calibrating the cameras 126 to remove image distortion within the camera lens and thus avoid or minimise distortion in the resulting alignment. It should be appreciated that calibration of the cameras to remove image distortion within the camera lens can be performed at any point of the method 200 before detection of the reference markers in the next step. Alternatively, calibration of the cameras to remove image distortion within the camera lens can be performed as a separate process and thus not form part of the method of the present invention.

At 210, the method comprises detecting the plurality of fiducial markers in one or more images of the screen captured by one or more registration devices, such as one or more cameras 126. In some embodiments, for each camera 126, the method includes locating at least four fiducial markers for a planar screen and at least six fiducial markers for a non-planar screen. In these embodiments, these are the minimum number of fiducial markers required to find the camera pose for each camera 126. However, it will be appreciated that the present invention is not limited to the particular number of fiducial markers employed and different techniques and applications may require different numbers of fiducial markers. The positioning of fiducial markers 136 or obtaining screen dimensions is the only user interaction that is required when one or more of the projection devices 122 is moved. This step can be removed if the screen 100 has physical markers that can be detected or other continuous measurement devices are used.

At 212, the method comprises calculating a first transformation or mapping between positions of the plurality of fiducial markers 136 on the screen 100 and respective positions of the plurality of fiducial markers in the one or more images of the screen. Hence, the method includes calculating a screen-to-camera transform, which uses the correlation between the fiducial markers 136 on the screen 100 of known geometry and the camera image position to determine the camera pose. With the camera pose determined there is now a transformation from any point on the screen 100 to the camera image.

At 213, the method comprises adding a plurality of reference or registration markers to the operational image. At 214, the method comprises detecting or determining the plurality of reference or registration markers in the images, which can be achieved by a number of techniques. In a long exposure technique to measure registration marker locations, the registration or reference markers are embedded in the projected image with slightly higher intensity or luminance than the remainder of the image. Through the accumulation of many images, the consistently higher intensity at the locations of the registration or reference markers will become detectable. However, in an individual image the amount of intensity increase is not noticeable to the operator or viewer and does not interfere with the operation of the system. This method akin to long exposure photography.

Figure 5:
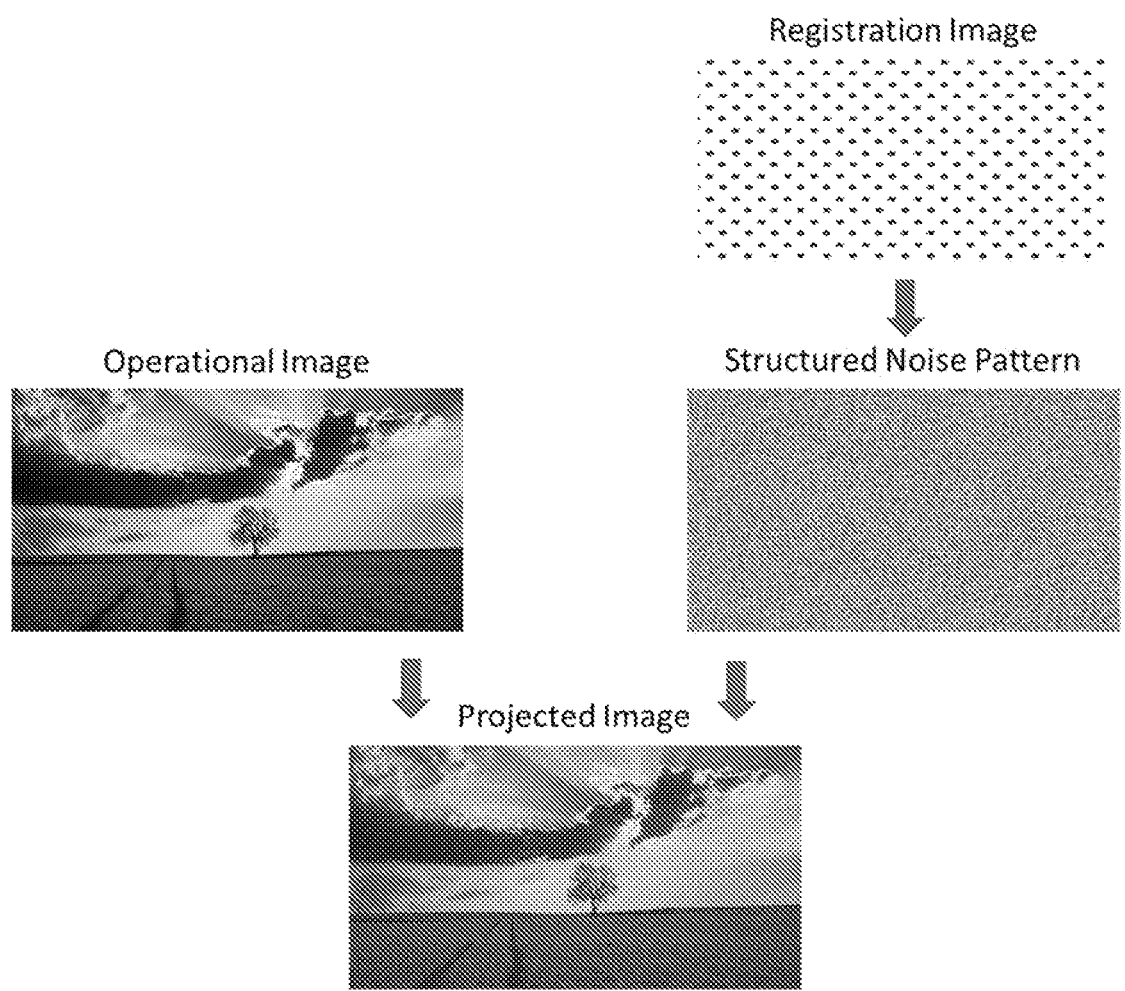
FIG. 5 illustrates the encoding of a registration image into a structured noise pattern, which is combined with an operational image to produce a projected image.
Figure 6:
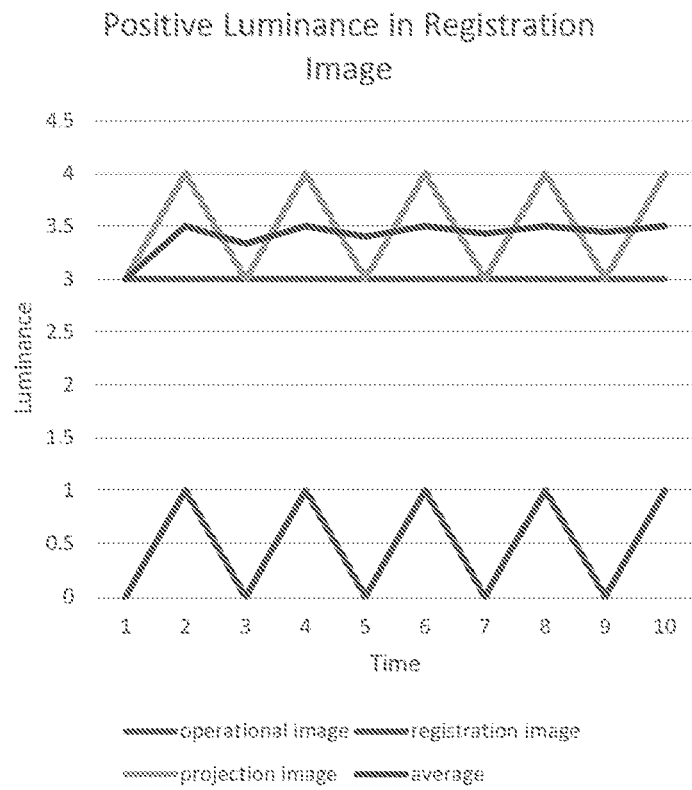
FIG. 6 shows the variance of luminance over time for a single pixel for a first long exposure technique for detecting registration or reference markers in a projected image.
Figure 7:
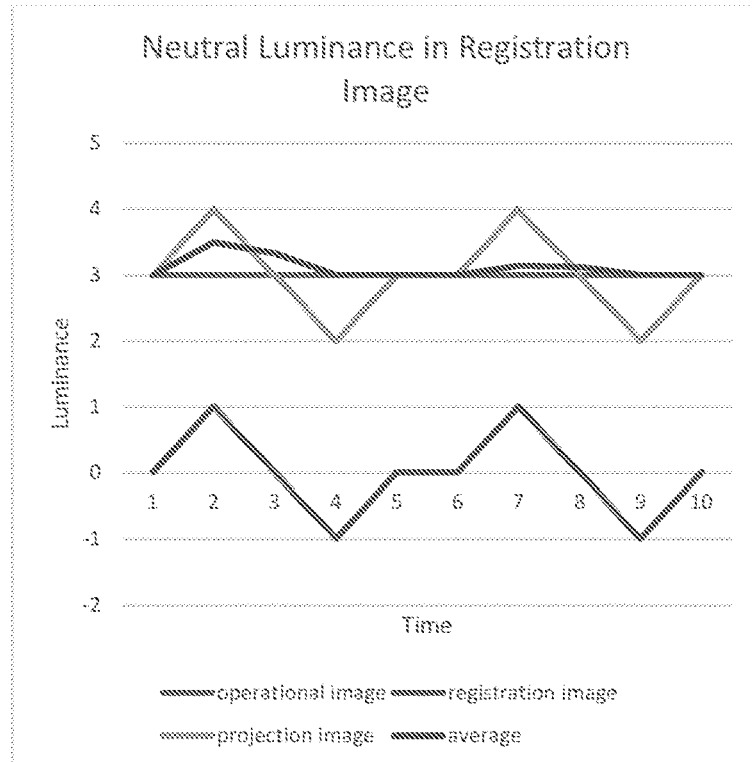
FIG. 7 shows the variance of luminance over time for a single pixel for a second long exposure technique for detecting registration or reference markers in a projected image.

With reference to FIG. 5, in one refinement of the long exposure method, the registration image can be encoded into a structured pattern, such as a structured noise pattern, which is combined with an operational image to produce a projected image to reduce the perceptibility to the viewer. A structured noise pattern is akin to applying a dither pattern to reduce the perceptibility of the registration or reference markers. The structure of the pattern can be temporal or spatial or a combination of both. FIGS. 6 and 7 illustrate how a structured noise pattern is applied for a single pixel accumulating over 10 frames. The operational image in this example is a constant level 3 intensity. The registration image is structured to reduce visibility of the pattern. In FIG. 6, the projected image is net positive over time, ranging from levels 3-4 in intensity. In FIG. 7, the projected image is net neutral over time, ranging from 2-4 in intensity.

In one refinement of this method, knowledge of the operational image can be used to enhance extraction of the reference marker. For example, using background subtraction techniques to subtract the operational image from the accumulator aids in extracting the registration image. Another example uses the average luminance or chrominance of the operational image to tune the registration device sensitivity, akin to dynamic exposure in photography.

The method can be applied either as an increase in luminance as described above, or as a decrease in luminance. The method of extraction and detection are the same but detect the reduced luminance. The system is more robust when using a combination of increased and decreased luminance methods. This technique works for standard colour as well as infra-red applications.

In another embodiment, the structured pattern technique can be applied to chrominance. The human visual system is less adept at discerning changes in chrominance whilst the registration device, such as a camera or light sensor, can detect these variations. However, chroma shift is only available in colour devices, such as RGB projection, and will not work in infra-red applications.

In a further embodiment, to better hide the registration or reference markers, the system can use optical illusions based on the limitations of human perception. This embodiment relies on the system having knowledge of the surrounding pixels when embedding the registration or reference markers in the projected image.

In the case of luminance, the luminance of the surrounding pixels is analysed to determine an overall luminance gradient. Where the luminance is smooth and flat, the system must rely on noise to hide the marker. Where the luminance has high frequency or variation, such as at the edges, the noise can be reduced, and the amplitude of the registration or reference marker can be increased to improve detection of the registration or reference marker.

The human visual system is particularly insensitive to chromatic changes. For example, circles of an identical colour can appear to be different colours where different colours surrounding the circles alter human perception of the coloured circles. A registration device can measure this whereas to the human eye the colours of the circles appear different. To use this for the detection or determination of registration or reference markers, pixels in the projected image are chroma shifted in a defined pattern, such as a star pattern. The star pattern shifts a center pixel in one direction and shifts the adjacent four pixels in the opposite direction. A human eye will integrate the subtle change to average out the colour making the registration or reference markers imperceptible, whereas the registration device can detect the markers. The longer the duration of sampling, the more options exist to make the registration image comprising the registration or reference markers less perceptible to the user.

During operation there may be features in the operational image that can be easily detected using computer vision algorithms. A simple example is a hard edge. Given that the system of the present invention has access to the operational image before it is projected, it can perform the computer vision analysis on the operational image and then search for the same feature in the projected image retrieved from the one or more registration devices, such as the one or more cameras. This method has the advantage that it does not require modification of the operational image. This method works best once the system has been calibrated at least once. This technique becomes even more powerful when the system has access to 3D data. In this method, the system collects drawing commands issued to a graphics subsystem. This allows the computer vision algorithm to separate the background from the foreground objects, which improves the performance of the feature extraction algorithm.

Figure 8:
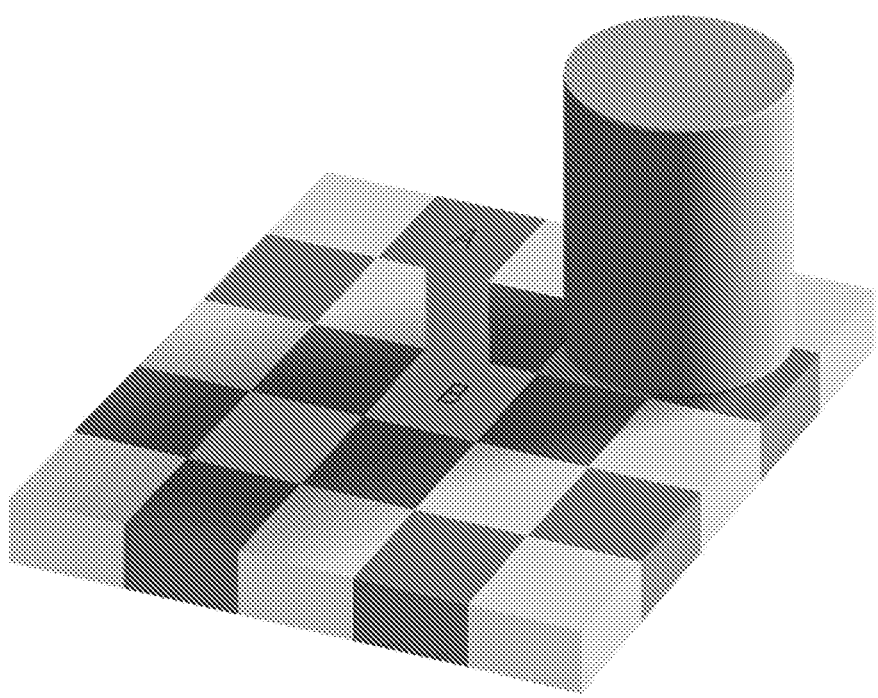
FIG. 8 illustrates the effects of shadows on luminance and the human perception of colour in relation to the detection of registration or reference markers.

In one refinement of the method, the 3D model is used to amplify the registration or reference markers that are embedded in the background while reducing the registration or reference markers that are over foreground objects. A further refinement of the algorithm uses the 3D model to determine shadows and amplifies registration or reference markers in shadow. FIG. 8 illustrates the effects of shadows on luminance and the human perception of colour. The luminance at points A and B is identical to the one or more registration devices, such as one or more cameras or light sensors.

The areas of overlap of the images from multiple projectors are sometimes referred to as blend zones. To present a visually seamless image to the operator, a smooth transition from one projected image to another is usually used in the blend zones. Detecting registration markers in blend zones or overlaps typically requires additional consideration because the contribution of the light comes from different projectors in varying intensity, therefore blurring the result. For example, in the middle of a blend zone resulting from images from four projectors, each projector will contribute 25% of the image, making the detection of a registration marker in an unaligned image difficult. Various methods to address or at least ameliorate this problem will now be described.

According to one method, the detection or determination of registration or reference markers is applied to a single projector at a time. The same registration or reference marker for the overlapping images from the other projectors is suppressed until an accurate reading is determined for the first projector. This is repeated for each of the projectors. If it takes one minute to gain an accurate determination of a registration or reference marker, then it will take four minutes to determine the registration or reference markers for all four projectors where the images from four projectors overlap.

A refinement of this method adjusts the weighted contribution of the pixels at the location of the registration or reference markers that is being measured toward the selected projector.

According to another embodiment, an extrapolation method places additional registration or reference markers near the blend zone or overlap and extrapolates the blend from there. This method can be used in addition to dynamic blend adjustment to reduce the number of registration or reference markers needed in the blend zone.

According to a further embodiment, a complex long exposure method uses a unique registration pattern for each projector such that the registration points for each projector can be discerned separately. If detection fails, the pattern may have been affected by interference between the projectors and a change in pattern is attempted. If changing the patterns continues to not produce a good result, the aforementioned extrapolation method or dynamic blend adjustment can be used.

Once the registration or reference markers have been detected, the method includes processing the registration or reference markers. The measured drift between the detected position of the registration or reference markers and their expected position should be uniform and predictable. If the difference for a registration or reference marker is discontinuous with the other registration or reference markers, the registration or reference marker can be rejected as being falsely detected. The method to implement this includes maintaining a history or log of detection of all the registration or reference markers. When a significant movement is detected, it is analysed across two dimensions. According to a first dimension, such analysis includes determining whether most of the other registration or reference markers for a particular projector also moved. If so, it is likely that the projector and/or the screen were moved and/or were changed and the registration or reference marker is considered valid. According to a second dimension, such analysis includes determining whether the new location of the registration or reference marker fits with a continuous surface relative to the other registration or reference markers. If so, it is likely the previous calibration was incorrect and the registration or reference marker is considered valid.

According to some embodiments, processing of the registration or reference markers includes accumulating the registration or reference markers. This method includes continually collecting data for the registration or reference markers over a configurable threshold period. If a change is stable over the threshold period, then the registration or reference marker is considered valid. Registration or reference markers are not just evaluated on an average basis, but variance. Registration or reference markers with high variance are rejected. By increasing the threshold period, the system will adjust itself less often and remain more stable, at the expense of reacting slower to sharp changes.

At 215, the method comprises detecting a plurality of feature points in the one or more images of the screen. Feature points are known positions in the operational images projected by the one or more projection devices 122. The feature points can be calculated in known positions in the one or more images. In some embodiments, the feature points are computer generated. Alternatively, the features points are extracted from a displayed arbitrary image. In some embodiments, the method includes displaying structured light patterns, such as alternating black and white stripes, to provide a set of feature points with known positions in the display image which can be easily located and identified in the camera image. In embodiments of the present invention including continuous calibration, structured light patterns can be embedded in the display image. The pattern may be visible to the user or hidden to resemble noise as described herein. The pattern can be distributed over a number of frames to reduce the visibility of the pattern. Feature points can also come directly from the image. In this case calibration can only happen when the distribution of feature points is wide enough to cover most of the displayed image.

At 216, the method comprises calculating a second transformation or mapping between positions of the plurality of reference/registration markers and feature points in the images displayed on the screen 100 and respective positions of the plurality of reference/registration markers and feature points in the one or more images of the screen captured by the one or more cameras 126. This provides a transformation or mapping from the display to the camera image. This mapping requires more points than the camera-to-screen transform because it does not necessarily conserve linearity. The feature points can come from multiple images in the case of continuous calibration.

At 218, the method comprises inverting the second transformation or mapping to determine a camera-to-display transform.

At 220, the method comprises combining the first transformation and the inverted second transformation to determine a mapping for positions on the screen to positions in the displayed images. In this mapping from the screen to the display and given a number of feature points in the displayed image, the same feature points are located in the camera image. The mapping from the display to the camera space is not likely to be easily calculated mathematically and so must be approximated. A uniform interpolation grid can be used if the feature points are arranged in a grid. Otherwise, a non-uniform interpolation surface can be used, such as a thin-plate spline.

At 222, the method comprises calculating an image warp based on the mapping and the layout of the images to be displayed on the screen.

At 224, the method comprises applying the image warp to the images from the image generator 124 to produce geometrically corrected images for display on the screen 100. Using the given or calculated layout of the projected images on the screen 100, the method uses the screen-to-camera transformation and then the camera-to-display transformation to map the unwarped image on the screen to the warped image at the display. The layout is also used to determine overlaps and blending, and can be applied before warping. The position and overlap of the images can be determined by the software for the best usage of available pixels. The method may include applying the image warp to the images from the image generator 124 during runtime using hardware or software image warping techniques.

For continuous alignment methods according to the present invention, the image being output by the image generator 124 must be available and the image capture can be performed by software or hardware. Continuous alignment methods include repeating steps 213 to 224.

In some embodiments, the present invention is in the form of a preconfigured system. For example, for a known system with automatic fiducial detection, or where continuous measurement devices are used, the image generator 124 can be completely configured without access to the hardware. This means the system can be initialized before installation. The user can simply run the display system with a supplied system configuration file. Alternatively, the present invention can be part of an embedded system with configuration specifics set in firmware. In other embodiments, the corrected geometry output can be calculated and uploaded to an external hardware device, or projector with in-built geometric correction functionality.

The latency from projection to registration must be known or measured. In a system that has user supplied parts, the preferred method is to measure the latency. For all latency related techniques, a history of registration frames is required for analysis. These methods require that registration images be stored over time.

One method is to add time stamps to the registration frames. The time stamps are extracted from the registration images and compared to the time of detection. This should be applied over multiple successive frames to reduce time variation due to external factors, such as network issues where the registration devices are in the form of IP cameras.

Another method uses one or more transient registration markers used for timing instead of position, like a "cue mark" in a movie. In one method, the transient registration marker is shown for a single frame, followed by an opposite or inverse pattern for the following frame. This method can be used where the registration device is sensitive enough to pick up a single frame. In another method, the registration marker is shown for a period. This period should be long enough for it to be reliably detected. The registration marker is then hidden for the same period, before being shown again. By measuring the phase, the offset from the time the registration point is embedded to the peak of detection can be determined. In one refinement of the transient registration marker methods, several measurements are taken and outliers are rejected as being erroneous readings.

Figure 9:
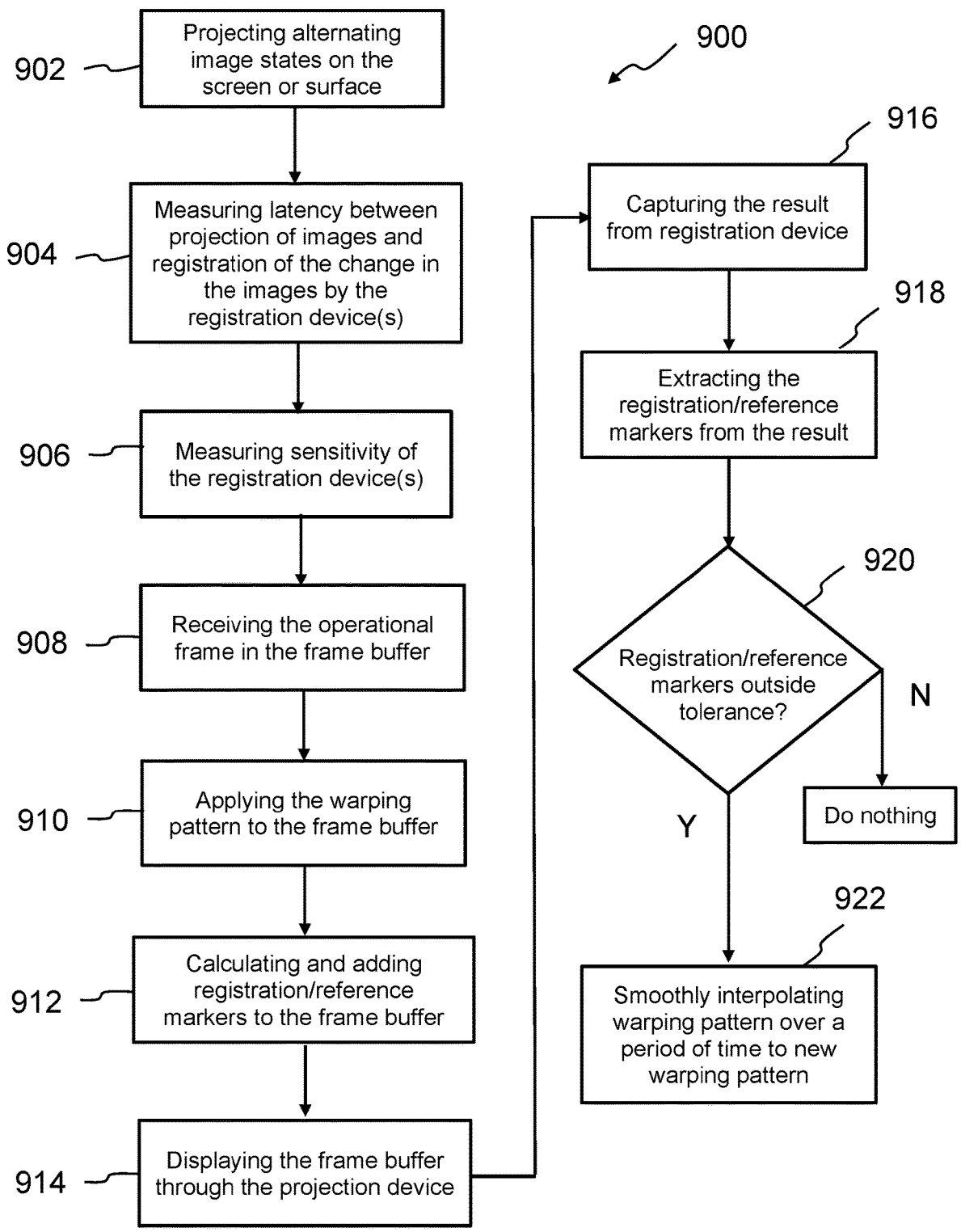
FIG. 9 is a general flow diagram of methods according to embodiments of the invention.

With reference to FIGS. 3 and 9, according to some embodiments, the present invention resides in a method 900 to calibrate images displayed on a screen or surface 100 by one or more projection devices 122. The method 900 comprises determining the parameters of the one or more projection devices 122 and the one or more registration devices, such as one or more cameras 126. The method comprises, at 902, projecting alternating image states on the screen or surface 100, such as alternating white and black images. At 904, the method 900 comprises measuring the latency between projection of the images and when the change in the images is registered by the one or more registration devices. At 906, the method comprises measuring the sensitivity of the one or more registration devices, such as the white/black balance of the one or more registration devices.

Whilst in operation, i.e. whilst the images are being projected onto the screen, the method 900 comprises, for each frame of the projected image, at 908, receiving the operational frame, i.e. the frame of the operational image, in the frame buffer of the image generator 124. At 910, the method comprises applying a warping pattern to the frame buffer. At 912, the method 900 comprises calculating and adding registration or reference markers to the frame buffer. At 914, the method comprises displaying the frame buffer through the projection device 122. At 916, the method comprises capturing the result from registration device 126. At 918, the method 900 comprises extracting the registration markers from the result. At 920, the method comprises determining if the registration or reference markers are outside a predetermined or specified tolerance. If so, at 922, the method comprises smoothly interpolating the warping pattern over a period of time to a new warping pattern.

Embodiments of the present invention also relate to a system and apparatus for performing the method 900.

In another example, it is envisaged that embodiments of the present invention can be used for maintaining calibration of an additive printing device to determine and correct for any drift or environmental interference without requiring interruption of printer operation.

Hence, embodiments of the present invention address or at least ameliorate at least some of the aforementioned problems. For example, the present invention enables complex display systems comprising one or more projection devices to be repeatedly or continually calibrated whilst the display system is in normal operation, rather than using a single calibration sequence as a separate process outside normal operation of the display system. Hence, alignment issues that can occur after conventional calibration, for example, due to vibration, or movable platforms as with simulators, can be repeatedly or continually compensated for during normal operation. This results in continual, accurate alignment of images during normal operation of the display system and avoids the cost and inconvenience of suspending normal operation to calibrate the display system. Alternatively, the methods of the present invention can be performed outside normal operation of the display systems as a single process, repeatedly or continually.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention. For example, it is envisaged that one or more features from two or more embodiments described herein can be combined to form one or more further embodiments.

The invention claimed is:

1. A method to continuously calibrate images projected on a screen or surface by one or more projection devices during display of the images, the method comprising:
defining a plurality of fiducial markers on the screen;
detecting, by a registration device, such as a camera, the plurality of fiducial markers in an image of the screen;
adding a plurality of reference markers to an image projected on the screen;
detecting, by the registration device, the plurality of reference markers in the projected image;
determining a mapping between positions of the reference markers on the screen to positions of the reference markers in the projected images;
detecting a plurality of feature points in the images detected by the registration device, wherein the feature points are known positions in the images projected by the one or more projection devices;
calculating a first transformation between positions of the fiducial markers on the screen and respective positions of the fiducial markers in the images detected by the registration device;
calculating a second transformation between the plurality of reference markers and feature points in the images displayed on the screen and respective positions of the plurality of reference markers and feature points in the images detected by the registration device;
combining the first transformation and the second transformation to determine the mapping for positions on the screen to positions in the displayed images;
calculating an image warp based on the mapping and a layout of the images to be displayed; and
applying the image warp to images from an image generator to produce geometrically corrected images for display on the screen.

2. The method of claim 1, further comprising defining a description of the screen selected from one of the following:

a 3D model of the screen; a geometric shape; a mesh of points; an interpolated point cloud.

3. The method of claim 2, wherein the defining a description of the screen is based on a user-defined method or a computer-generated method, selected from one of the following: photogrammetry; reconstruction from LiDAR data or other measurements; a depth-based method.

4. The method of claim 1, further comprising defining a layout of the images to be displayed on the screen including any overlaps or blend zones of the images.

5. The method of claim 1, including one of the following: a) projecting and positioning the fiducial markers on the screen; and b) positioning physical fiducial markers on the screen.

6. The method of claim 1, wherein: a) the feature points are calculated in known positions in the one or more images; or b) the features points are extracted from a displayed arbitrary image.

7. The method of claim 1, further comprising applying the image warp to images from an image generator during runtime using hardware or software image warping techniques.

8. The method of claim 1, wherein adding the plurality of reference markers to the projected image comprises embedding the reference markers in an operational image with a higher and/or lower intensity, luminance or chrominance than the remainder of an operational image.

9. The method of claim 1, wherein adding the plurality of reference markers to the projected image comprises encoding a registration image into a structured pattern, such as a structured noise pattern, and combining the structured pattern with an operational image to produce the projected image.

10. The method of claim 9, further comprising one of the following: a) extracting the plurality of reference markers from the projected image using a background subtraction technique to subtract the operational image from accumulated frames of the projected image; and b) tuning the sensitivity of the registration device based on an average luminance or chrominance of the operational image.

11. The method of claim 1, wherein the plurality of reference markers is imperceptible to a human.

12. The method of claim 11, further comprising chrominance shifting pixels in the projected image in a defined pattern, in particular, chrominance shifting a centre pixel in one direction and chrominance shifting the adjacent pixels in the opposite direction.

13. The method of claim 8, further comprising detecting one or more features in the operational image using computer vision analysis before projection of the operational image and searching for the same one or more features in the projected image detected by the registration device.

14. The method of claim 13, further comprising one or more of the following: a) amplifying the reference markers embedded in the background of the operational image while reducing the reference markers embedded in the foreground of the operational image; and b) determining shadow in the operational image and amplifying the reference markers in shadow.

15. The method of claim 1, wherein detecting reference markers in an overlap or blend zone of images from multiple projection devices comprises detecting the reference markers in an image from a single projection device at a time.

16. The method of claim 15, further comprising one of the following: a) suppressing the same reference markers in the overlap or blend zone from the other projection devices until the reference markers are detected for the first projection device; and b) applying a weighted contribution of the pixels at the location of the reference markers that is being measured toward the selected projection device; c) placing additional reference markers near the overlap or blend zone and extrapolating into the blend overlap or blend zone; d) using a unique pattern of registration markers for each projection device.

17. The method of claim 1, further comprising projecting alternating image states on the screen or surface, such as alternating white and black images.

18. The method of claim 17, further comprising measuring latency between projection of the images and when the change in the image states is registered by the registration device.

19. The method of claim 1, further comprising measuring the sensitivity of the registration device, such as a white/black balance of the registration device.

20. The method of claim 1, comprising receiving each frame of the operational image in a frame buffer of the image generator during display of the images.

21. The method of claim 20, further comprising one or more of the following:
   a) applying an image warping pattern to the frame buffer;
   b) calculating and adding the reference markers to the frame buffer; and
   c) displaying the frame buffer through the projection device.

22. The method of claim 1, further comprising determining if the reference markers are outside a predetermined or specified tolerance, and if so, smoothly interpolating the image warping pattern over a period of time to a new image warping pattern.

23. An apparatus to continuously calibrate images displayed on a screen or surface by one or more projection devices during display of the images, the apparatus comprising a non-transitory computer-readable medium having stored thereon programming instructions executable by a processor which, when executed, perform the following operations:
   defining a plurality of fiducial markers on the screen;
   detecting, by a registration device, such as a camera, the plurality of fiducial markers in an image of the screen;
   adding a plurality of reference markers to an image projected on the screen;
   detecting, by the registration device, such as a camera, the plurality of reference markers in the projected image;
   determining a mapping between positions of the reference markers on the screen to positions of the reference markers in the projected images;
   detecting a plurality of feature points in the images detected by the registration device, wherein the feature points are known positions in the images projected by the one or more projection devices;
   calculating a first transformation between positions of the fiducial markers on the screen and respective positions of the fiducial markers in the images detected by the registration device;
   calculating a second transformation between the plurality of reference markers and feature points in the images displayed on the screen and respective positions of the plurality of reference markers and feature points in the images detected by the registration device;
   combining the first transformation and the second transformation to determine the mapping for positions on the screen to positions in the displayed images;
   calculating an image warp based on the mapping and a layout of the images to be displayed; and applying the image warp to images from an image generator to produce geometrically corrected images for display on the screen.

24. A system to continuously calibrate images displayed on a screen or surface by one or more projection devices during display of the images, the system comprising:
one or more image generators;
one or more projection devices to project images generated by the one or more image generators onto a screen;
one or more registration devices, such as cameras, to capture images of the screen; and
one or more processors configured to:
a. define a plurality of fiducial markers on the screen;
b. detect, by a registration device, such as a camera, the plurality of fiducial markers in an image of the screen;
c. add a plurality of reference markers to an image projected on the screen;
d. detect the plurality of reference markers in the projected image;
e. determine a mapping between positions of the reference markers on the screen to positions of the reference markers in the projected images including:
detecting a plurality of feature points in the images detected by the registration device, wherein the feature points are known positions in the images projected by the one or more projection devices,
calculating a first transformation between positions of the fiducial markers on the screen and respective positions of the fiducial markers in the images detected by the registration device;
calculating a second transformation between the plurality of reference markers and feature points in the images displayed on the screen and respective positions of the plurality of reference markers and feature points in the images detected by the registration device, and
combining the first transformation and the second transformation to determine the mapping for positions on the screen to positions in the displayed images;
f. calculate an image warp based on the mapping and a layout of the images to be displayed; and
g. apply the image warp to images from the one or more image generators to generate geometrically corrected images for display on the screen.

\* \* \* \* \*